Oct. 31, 1961     A. WEILAND     3,006,128
LAWN CARE UNIT
Filed April 20, 1960

*INVENTOR.*
ALFRED WEILAND
BY
*Robert M. Barr*
ATTORNEY

3,006,128
LAWN CARE UNIT
Alfred Weiland, Clearwater, Fla., assignor of one-third to Robert M. Barr, Wayne, Pa.
Filed Apr. 20, 1960, Ser. No. 23,435
3 Claims. (Cl. 56—194)

The present invention relates to lawn care apparatus and more particularly to a collecting medium, associated with a grass cutting and discharge unit for receiving cuttings and litter, such unit being preferably a rotary type mower.

Heretofore in the operation of rotary mowers it has been the practice to directly eject all cuttings onto the lawn by centrifugal action with the result the useful comminuted material is not only haphazardly thrown out but is also mingled with sticks, stones and other debris which requires a raking operation to obtain the desired finished appearance. This adds materially to the most of lawn care. As a solution various types of fabric bags have been attached to power mowers to collect and carry off all cuttings which are then only useful as the makings of a compost pile.

An object of the present invention is to provide an improved collector for a power mower wherein lawn cuttings are discharged and spread evenly over the lawn in the wake of a mower or the like.

Another object is to provide an attachment for a rotary type mower wherein the discharge from the mower of comminuted grass cuttings and accompanying debris, is collected and subjected to a sorting operation to remove sticks, stones and litter while simultaneously spreading litter-free grass cuttings over the lawn.

A further object is to provide a collector attachable to a lawn mower wherein moving discharged material is under a selective control to vary the feeding velocity and the output quantity.

A still further object is to provide a combined collector and rotary power mower wherein means is operable to divert wet grass cuttings from entering a collecting and spreading unit.

Other objects will appear hereinafter.

Figure 1:
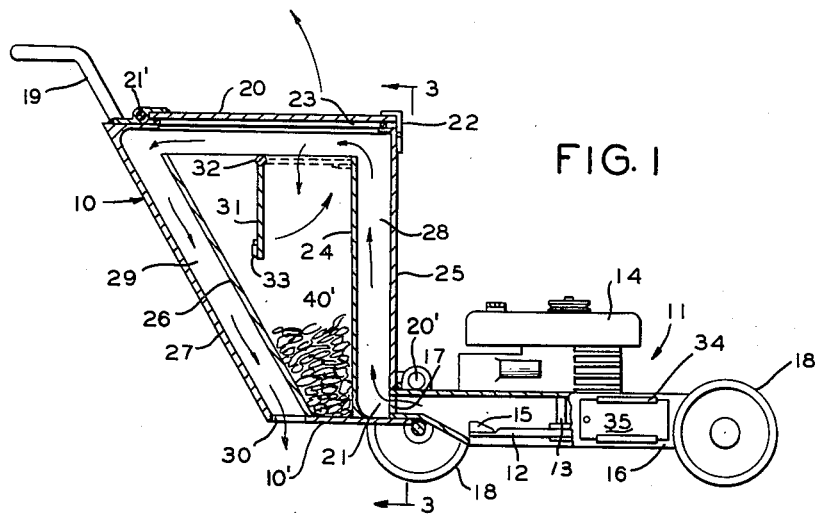
FIG. 1 is a sectional elevation view of a collector of lawn material shown as an attachment for a rotary power mower with parts broken away to show the discharge to the collector.
Figure 2:
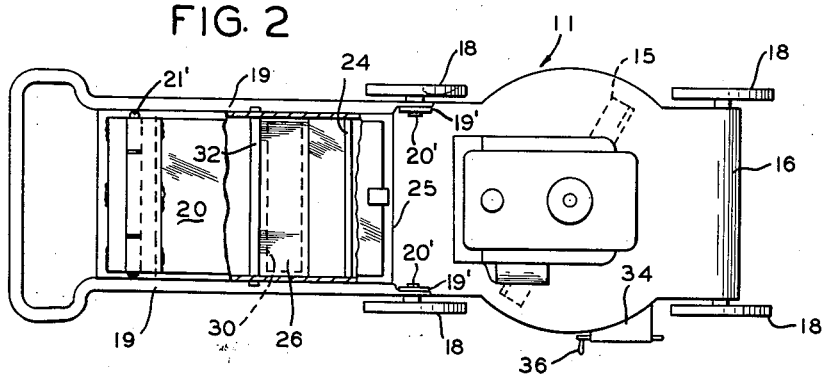
FIG. 2 is a plan view of the same partly broken away.
Figure 3:
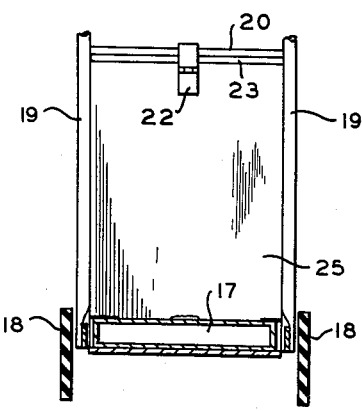
FIG. 3 is a section view on line 3—3 of FIG. 1.

Referring to the drawings, a receptacle 10 embodying one form of the invention is shown illustratively as attached to the rear of a rotary type power mower 11 wherein a horizontally disposed cutting blade 12 is attached at its center to a shaft 13 driven by a motor 14 in the conventional manner. The free ends of the blade 12 extend radially from the shaft and terminate respectively, in this instance, in upstanding angularly disposed disintegrating cutters 15 which also function as impellers to blow a stream of material into the receptacle 10. The blades 12 are housed in an open-bottom casing 16 which, in the present instance, has a rear discharge opening 17. The casing 16 with its housed parts is supported by wheels 18 in any suitable number and arrangement. Handles 19 project rearwardly from the casing 16 for conveniently manipulating the mower, such handles 19 being fastened to opposite sides of the receptacle 10 and terminate respectively in apertured ears 19' for attachment to laterally projecting lug pins 20' fixed to the upper face of the casing 16 so that the unit can be readily removed when required.

The receptacle 10 is an open top receptacle having a hinged cover 20 and is removably mounted at the outlet end of the casing frame where it has a transverse inlet 21 adjacent to its bottom 10' to form a continuation of the casing discharge opening 17. The cover 20 is hinged at one end on a transverse pin 21' and has a locking latch 22 at the other end to hold the cover securely in place and be sealed against leakage of propelled material by an encircling gasket 23.

For guiding the material entering by way of the inlet 21, there is a partition 24 rising from the receptacle bottom in spaced relation to the front wall 25 of the receptacle to terminate in spaced relation to the cover 20. Also there is a second partition 26 rising from the bottom 10' of the receptacle in spaced relation to the rear wall 27 to terminate also spaced from the cover 20. Thus the two partitions with the receptacle walls and the cover 20 form a passage 28 leading from the inlet 21 upwardly, then across the interior of the receptacle and down a passage 29 to a transverse discharge outlet 30 through the receptacle bottom 10'. Thus the two partitions 24 and 25, with the side walls of the receptacle, form a receiving chamber 40' in communication with the portion of the passage 28 below the cover 20. This outlet 30 extends the width of the receptacle to discharge such material for lawn mulching.

In operation the stream of material delivered from the impellers 15 passes across the upper interior of the receptacle so all sticks, stones and other undesirable heavy material drop by gravity into the receptacle while the desirable relatively light comminuted fines continue in the stream to discharge from the outlet and be spread as the receptacle travels forwardly.

In some instances, and particularly when there are few heavy objects it may be desirable to control the stream of material and to that end a damper 31 is pivotally mounted medially of the receptacle with its pivot 32 substantially in the horizontal plane of the free ends of the two partitions 24 and 26. For general use the damper 31 is in the depending position shown in FIG. 1, so that the full top opening of the receptacle is exposed to the stream of material and the pull of gravity. When moved to the dotted line position the stream of material is restricted to increase both the velocity and the quantity of discharged material. A handle 33 projects conveniently for selecting the desired position of the damper.

Under conditions where the grass being cut is saturated and the cuttings are wet and soggy, it is undesirable to permit such to enter the receptacle and so to meet this condition a supplemental flanged outlet 34 is formed in one side of the casing 16 to be controlled by a closing plate 35 having a manually operated finger 36. Thus the supplemental outlet can be opened and closed as desired.

It will now be apparent that a novel means has been devised for handling grass cuttings mixed with sticks, stones and other litter whereby such undesirable material is separated from the grass cuttings to collect in a receptacle while the cuttings as received in comminuted form from a rotary mower are separately discharged to spread evenly in a relatively wide path upon the lawn.

Having now described my invention I claim:

1. A device for separating, collecting and discharging material propelled from a rotary mower comprising an open top receptacle having an inlet at one side, a bottom for said receptacle having an outlet adjacent the opposite side, a cover for said top, two partitions upstanding from the bottom of said receptacle respectively spaced from two opposite receptacle walls and terminating spaced from said cover to form a passage from said inlet to said outlet and also forming an open top chamber communicating with said passage means to support said receptacle with said outlet in close proximity to the ground, and impelling means to propel comminuted grass cuttings and debris through said passage, whereby gravity responsive debris at the passage portion drops into said chamber while the light cuttings discharge from said outlet to be spread in the wake of the grass cutter.

2. A lawn care unit adapted for attachment to a rotary lawn mower comprising a closed top receptacle, formed by two sides, a front wall, a rear wall and a bottom, said front wall having an inlet adjacent to said bottom to receive material from a rotary lawn mower, said bottom having an outlet to discharge material onto the ground, means on said bottom extending upwardly to form a passage from said inlet, means in said bottom extending upwardly to form a passage to said outlet, whereby a horizontal opening is formed communicating with said passages and with the interior of said receptacle to permit certain material conveyed from the inlet to the outlet to drop by gravity into said receptacle and the remaining material to discharge from the outlet.

3. A lawn care unit according to claim 2 wherein the passage forming means from the inlet is a partition spaced from one wall of the receptacle and terminating in spaced relation to said top, and the passage forming means to said outlet is a partition spaced from another wall of the receptacle and terminating in spaced relation to said top.

References Cited in the file of this patent

UNITED STATES PATENTS

| | | |
|---|---|---|
| 824,927 | Hellyer | July 3, 1906 |
| 1,122,375 | Engle | Dec. 29, 1914 |
| 1,309,879 | Davids et al. | July 15, 1919 |
| 1,943,306 | Fraser | Jan. 16, 1934 |
| 2,824,335 | Moffat | Feb. 25, 1958 |
| 2,882,668 | Murillo | Apr. 21, 1959 |
| 2,955,404 | Strasel et al. | Oct. 11, 1960 |